Feb. 28, 1933.   R. J. BRITTAIN, JR., ET AL   1,899,010

JOURNAL BOX

Filed March 8, 1930   3 Sheets-Sheet 1

INVENTORS.
OTTO W. YOUNG.
RICHARD J. BRITTAIN, JR.
BY
THEIR ATTORNEY.

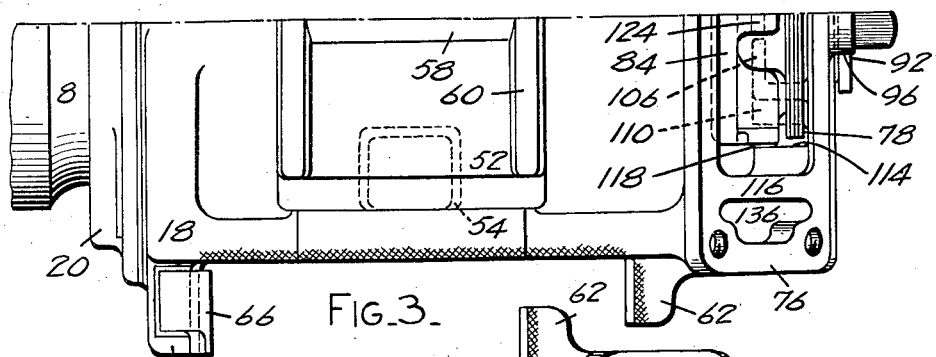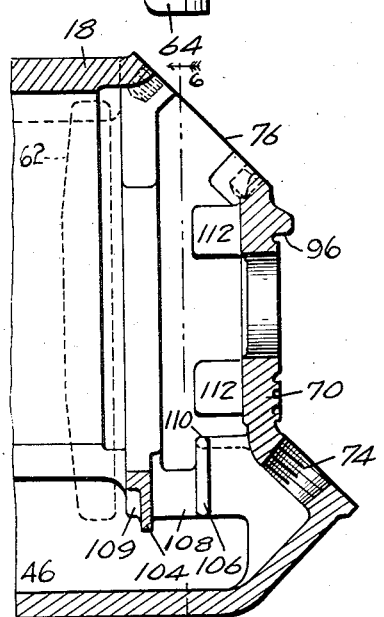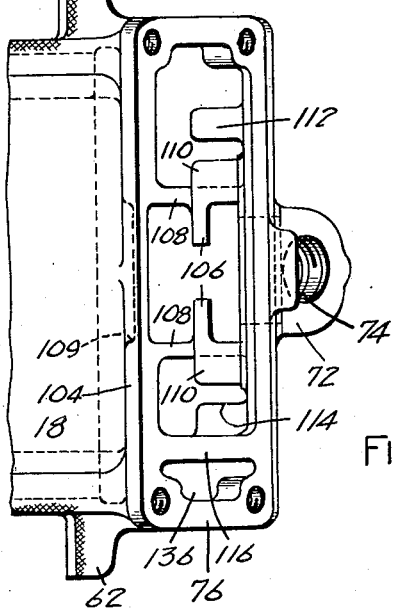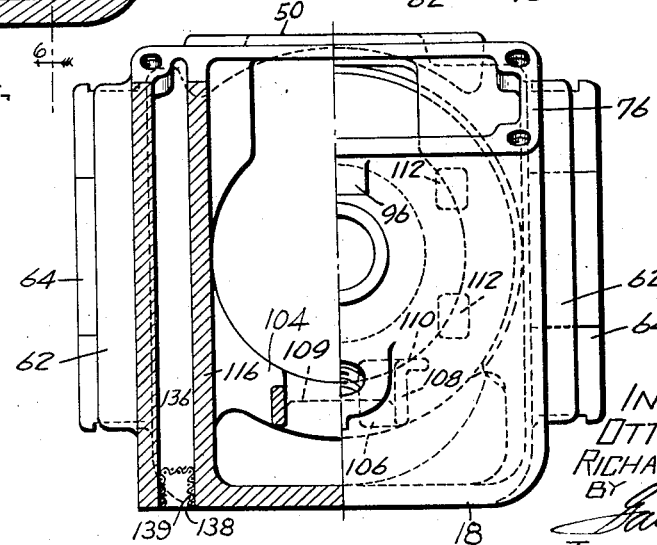

Feb. 28, 1933.  R. J. BRITTAIN, JR., ET AL  1,899,010
JOURNAL BOX
Filed March 8, 1930  3 Sheets-Sheet 3
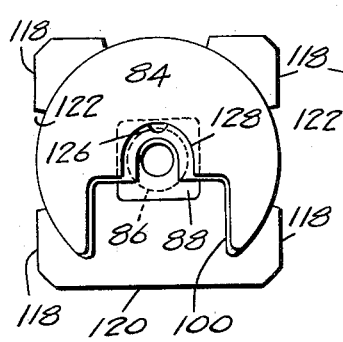
FIG. 7
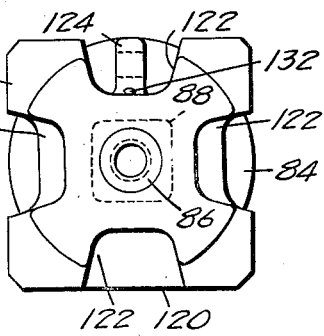
FIG. 8
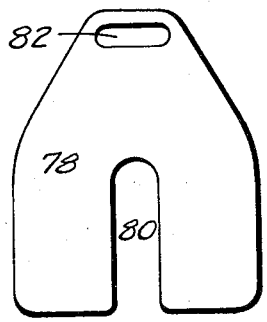
FIG. 9
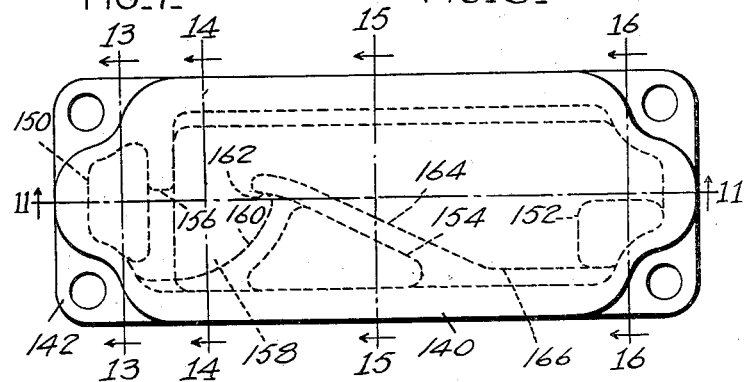
FIG. 10
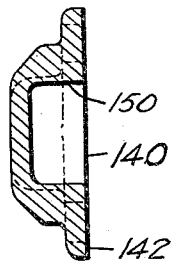
FIG. 13
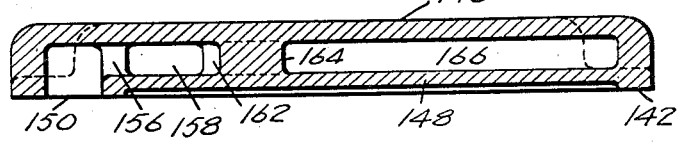
FIG. 11
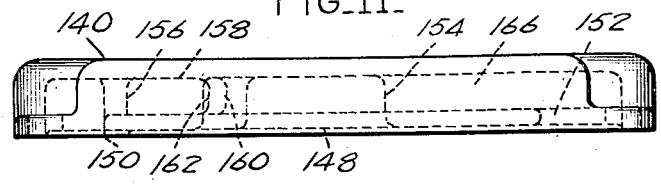
FIG. 12
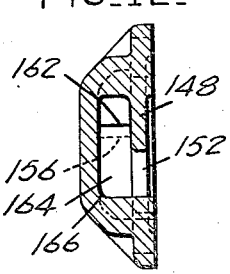
FIG. 16
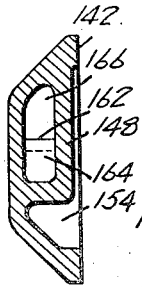
FIG. 15
FIG. 14
INVENTORS
OTTO W. YOUNG
RICHARD J. BRITTAIN JR.
BY
THEIR ATTORNEY Patented Feb. 28, 1933

1,899,010

UNITED STATES PATENT OFFICE

RICHARD J. BRITTAIN, JR., OF BLOOMFIELD, AND OTTO W. YOUNG, OF EAST ORANGE, NEW JERSEY, ASSIGNORS TO GENERAL MOTORS CORPORATION, OF DETROIT, MICHIGAN, A CORPORATION OF DELAWARE

JOURNAL BOX

Application filed March 8, 1930. Serial No. 434,339.

This invention relates to journal boxes and the like and comprises all the features of novelty herein disclosed. An object of the invention is to provide improved means for circumventing leakage of material at the joint between a shaft and a housing. Another object is to provide a journal box construction wherein interior parts can be inspected or inserted and removed with greater facility than heretofore. To these ends and to improve generally and in detail upon devices of this character, the invention also consists in the various matters hereinafter described and claimed.

In its broader aspects, the invention is not necessarily limited to the specific construction selected for illustrative purposes in the accompanying drawings in which Fig. 1 is a vertical central section of a journal box and associated parts.

Fig. 3 is a plan view of one half of the box.

Fig. 4 is a vertical section of a portion of the box.

Fig. 5 is a plan view of a portion of the box.

Fig. 6 is an end view to smaller scale, with one-half in section on the line 6—6 of Fig. 4.

Fig. 7 is a face view of a thrust block.

Fig. 8 is a rear view of Fig. 7.

Fig. 9 is a face view of a spacing plate.

Fig. 10 is a plan view of a lid.

Fig. 11 is a sectional view on line 11—11 of Fig. 10.

Fig. 12 is a side view of the lid and

Figure 1:
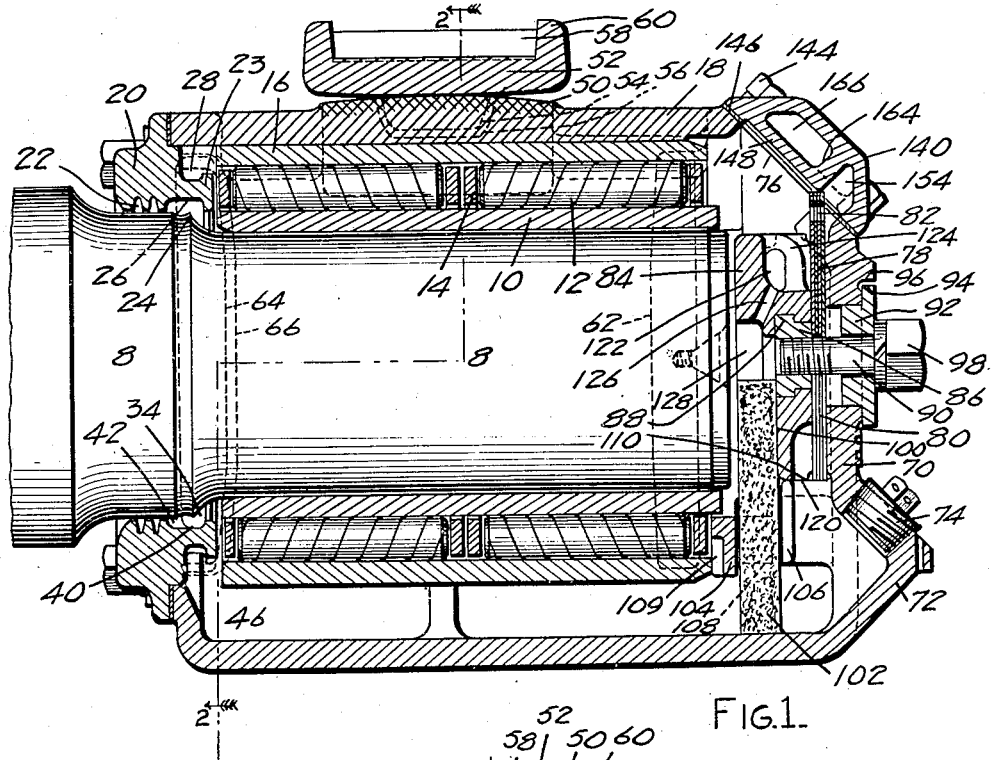
Figure 2:
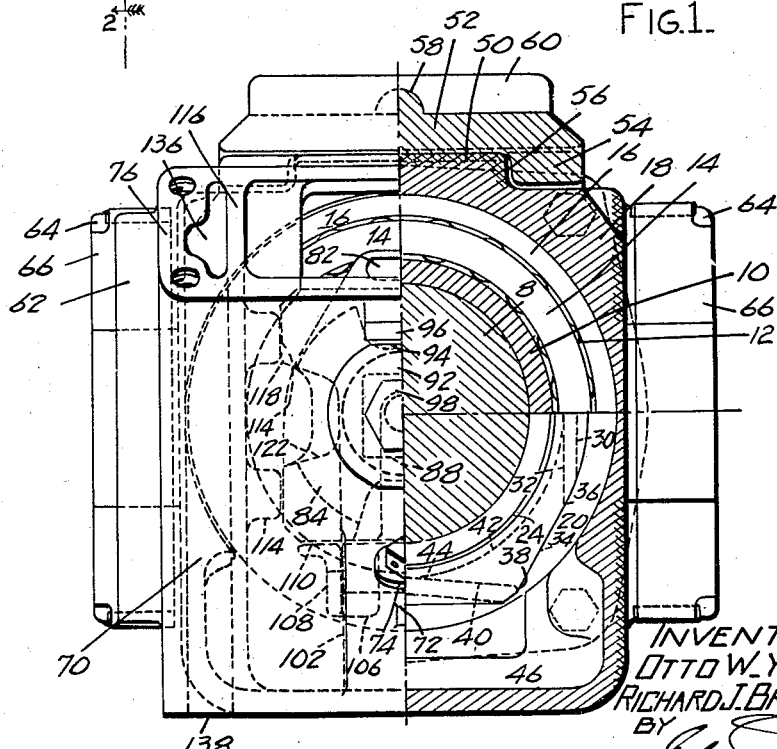
Fig. 2 is an end view with parts in section on the line 2—2 of Fig. 1.

Figs. 13, 14, 15, and 16 are sectional views on the corresponding section lines indicated in Fig. 10.

The numeral 8 indicates a shaft or axle carrying a raceway sleeve 10 for antifriction bearings, herein shown as rollers 12 having cage rings 14. The rollers run in an outer sleeve 16 inserted endwise into the bore of a housing or axle box 18. The box is closed at the rear end by a flanged end cap 20 which is secured in place by screw bolts. The cap has grease grooves 22 at the axle and is provided with an internal projection 23 surrounding a lubricant collecting rib or slinger 24 on the axle. The projection has a wide internal groove 26 opposite to the rib 24 and a narrower external groove 28, each groove being arcuate and unbroken over the upper half of the axle. The external groove merges at each end with a vertical tangential face 30 at axle level whereby lubricant thrown into the groove from the rollers will drop straight down into the box. A portion of the width of the internal groove 26 merges, at each end, with a vertical tangential face 32 at axle level, the face 32 thus forming one wall of an opening 34 through the projection 23 from one groove to the other. Each opening 34 extends from the terminus 36 of the face 32 to the terminus 38 of a dam or drain surface 40 which inclines downwardly in opposite directions from a point directly under the axle. That portion of the wide internal groove 26 nearest to the grease grooves 22 continues downwardly in each direction as at 42 to meet the drain surface 40 at a point 44. Lubricant thrown into the groove 26 can run down the flat faces 32 and through the openings 34 to the reservoir 46 in the bottom of the box. Lubricant thrown off the lower portion of the axle from the rib 24 runs down the drain surfaces 40 to the reservoir. The bottom of the drain surface also acts as an obstruction to prevent the lubricant from splashing upwardly and collecting at the low point of the axle where leakage is most apt to occur. To further insure against leakage of lubricant along the axle and entrance of foreign matter due to the piston like pumping action of the axle in the box, the box is provided with the improved breather construction hereinafter described.

The top of the box has a raised portion 50 which is cylindrically crowned longitudinally and chilled to support a rocking seat plate 52 which has depending retaining lugs 54 entering recesses 56 in the box. The seat plate has a rounded lug 58 to enter a slot in the usual equalizer bar (not shown) which is intended to rest on the crowned upper face of the seat plate between side walls 60. The sides of the box have pedestal flanges 62 and 64, the outer flanges 62 being vertically crowned and chilled, the inner pedestal flanges 64 being wider and covered by wear plates 66 which have their upper and lower ends bent through end slots of the flanges and welded.

The front of the box comprises an integral end wall 70 provided with a boss or enlargement 72 which has a plugged filling opening at 74. The end wall also has an opening at the top provided with an inclined rim 76 to support a detachable hollow lid. U-shaped spacing plates 78 having legs 80 and hand holes 82, and a thrust block 84 are insertible through the opening. The thrust block is preferably made of bronze cast around a steel nut 86 having a square head 88. A detachable screw bolt 90 is threaded in the nut and extends between the legs 80 of the spacing plates and through a flanged washer 92 to the outside of the box. The washer fits a round hole in the end wall 70 and its flange engages the outer face of the end wall. The flange is also flattened as at 94 opposite to a flattened lug 96 on the box to prevent rotation of the washer. The screw bolt 90 has a head 98 which engages a lock washer outside the washer 92. Upon removal of the screw bolt, the spacing plates and the thrust block can be removed vertically through the inclined opening. The end wall is beyond and forms the outer edge of the opening which is thus located in lateral opposition to the space inside of the end wall. Removal of the washer 92 provides for easy visual inspection of the interior.

The thrust block has a slot 100 for a wick 102 which extends straight down to the bottom of the box between an arcuate cross web 104 and a pair of oppositely extending lugs 106 on longitudinal bracing webs 108. A cut-out portion 109 of the web 104 lets oil run from the sleeve 16 to the reservoir. The interior of the box has holding means for the thrust block and spacing plates, comprising flat shelves 110, flat faced lugs 112, and flat faced lugs 114 on a vertical partition 116. The thrust block has flat vertical side faces 118 to engage the lugs 112 and 114 and a flat bottom wall 120 to rest on the shelves 110. The legs 80 of the spacing plates also rest on the shelves 110 between the lugs 112 and 114. To save expense of material, the thrust block is skeletonized by recesses 122 in all four sides, the upper recesses having a web 124 to provide a handle. To drain lubricant from the upper recess 122 and so prevent leakage at the bolt 90, an inclined passage 126 leads down to a semicircular recess 128 over the wick. The flat faces on the interior of the box and on the exterior of the thrust block locate the thrust block in a position to receive the screw bolt 90. The spacing plates are removed before the thrust block and inserted after the thrust block and are held down by a lid.

The box has a straight vertical passage 136 at one side of the partition 116, the passage being open to the atmosphere at 138 under the box and forming a portion of a breather device. The passage leads through a strainer 139 to a hollow lid or cover 140 having a circuitous passage communicating with the interior of the box at the side opposite to the passage 136. The hollow lid has a rim 142 coextensive with the inclined rim 76 of the box and is clamped against an interposed gasket 146 by screw bolts 144 at the corners. The lid has a flat bottom wall 148 slightly raised above the rim and interrupted at three places. An opening 150 at one end registers with the vertical passage 136 through the box. An opening 152 at the other end communicates with the interior of the box. Another opening 154 in the bottom wall is merely a blind space into which the upper ends of the spacing plates 78 partially project. The first opening 150 leads past the lower end of a partition 156 to a wider space 158 having a curved boundary wall 160 which gradually decreases the width of the space and returns upon itself or overhangs to provide the hook or baffle 162. Beyond the baffle 162, the lid has an inclined wall 164 which makes a gradually widening space 166 communicating at the end with the opening 152 leading to the interior of the box. Upon a longitudinal shifting of the axle towards the thrust block, the air, instead of being forced out of the box past the grease grooves 22, goes into the lid opening 152, through the lid, and down the passage 136 to the atmosphere. Upon a longitudinal shifting of the axle away from the thrust block, there is no suction effect at the grease grooves tending to draw in air and foreign matter but air is drawn in through passage 136 and through the communicating hollow lid. If such air is dust laden, gravity and the baffle 162 tend to clear it. The passage through the lid is narrowest above the baffle 162 and widens out at each side of the baffle to decrease the velocity of the air and so tends to release foreign matter suspended therein.

We claim:
1. In a device of the character described, a housing, a shaft extending into the housing and shiftable endwise therein, means providing a close joint where the shaft enters the housing, the housing having an opening, a lid closing the opening, the housing having a passage leading through it from the outside to the lid, and the lid having a passage connecting said housing passage with the interior of the housing; substantially as described.

2. In a device of the character described, a housing, a shaft extending into the housing and shiftable endwise therein, means providing a close joint where the shaft enters the housing, the housing having a passage open to the atmosphere at one end, and a hollow member attached to the housing and providing communication between said passage and the interior of the housing; substantially as described.

3. In a device of the character described, a housing, a shaft extending into the housing and shiftable endwise therein, means providing a close joint where the shaft enters the housing, the housing having a passage open to the atmosphere at one end, and a hollow member having a passage providing communication between said housing passage and the interior of the housing, and one of the passages having a baffle thereon; substantially as described.

4. In a device of the character described, a housing, a shaft extending into the housing and shiftable endwise therein, means providing a close joint where the shaft enters the housing, the housing having a passage extending through it from top to bottom and partitioned off from the interior, and a hollow member attached to the housing, the member having a passage communicating with one end of said housing passage and with the interior of the housing; substantially as described.

5. In a device of the character described, a housing, a shaft extending into the housing and shiftable endwise therein, means providing a close joint where the shaft enters the housing, the housing having an opening and a passage through it near the opening, and a hollow lid over the opening and providing communication between said passage and the interior of the housing; substantially as described.

6. In a device of the character described, a housing, a shaft extending into the housing, the housing having an opening and a passage through it near the opening, a hollow lid over the opening, and the lid having a passage extending lengthwise thereof, one end of the passage communicating with the housing passage and the other end communicating with the interior of the housing; substantially as described.

7. In a device of the character described, a housing, a shaft extending into the housing, the housing having an opening and a passage through it near the opening, and a hollow lid over the opening, the lid having a passage communicating at one end with the housing passage and communicating at the other end with the interior of the housing, and an intermediate portion of the lid passage having a restricted area; substantially as described.

8. In a device of the character described, a housing, a shaft extending into the housing, the housing having an opening and a passage through it terminating near the opening, a hollow lid covering the opening and having a passage communicating with the housing passage and with the interior of the housing, and a baffle wall in said lid passage; substantially as described.

9. In a device of the character described, a housing, a shaft, a thrust block for the shaft, the housing having an opening for passage of the thrust block and an end wall beyond the opening, and means for clamping the thrust block to the end wall of the housing, said clamping means being accessible for removal from the outside of the housing whereby the thrust block can be passed through said opening by movement transversely of the clamping means; substantially as described.

10. In a device of the character described, a housing, a shaft, a thrust block for the shaft, the housing having an opening for passage of the thrust block and an end wall beyond the opening, spacing plates between the thrust block and the end wall of the housing, means for clamping the thrust block and spacing plates to the end wall, said clamping means being accessible for removal from the outside of the housing whereby the thrust block and spacing plates are removable through said opening by movement transversely of the clamping means; substantially as described.

11. In a device of the character described, a housing, a shaft, a thrust block for the shaft, the housing having an opening for passage of the thrust block and an end wall beyond the opening, and means for detachably clamping the thrust block to the end wall of the housing, the thrust block having means for drawing it out through said opening by movement transversely of the clamping means; substantially as described.

12. In a device of the character described, a housing, a shaft, a thrust block for the shaft, the housing having an opening for passage of the thrust block and an end wall beyond the opening, and means for securing the thrust block to the end wall of the housing and comprising a member passing through the end wall and removably engaging the thrust block; substantially as described.

13. In a device of the character described, a housing, a shaft, a thrust block for the shaft, the housing having an opening for passage of the thrust block and an end wall beyond the opening, and means for clamping the thrust block to the end wall of the housing and comprising a headed screw removably threaded in said thrust block and having its head disposed at the outside of the end wall; substantially as described.

14. In a device of the character described, a housing, a shaft, a thrust block for the shaft, the housing having an opening for passage of the thrust block and an end wall beyond the opening, and means for clamping the thrust block to the end wall of the housing and comprising a headed screw removably threaded in said thrust block and having its head disposed at the outside of the end wall, and a washer supporting the screw and engaging said end wall; substantially as described.

15. In a device of the character described, a housing, a shaft, a thrust block for the shaft, and means for securing the thrust block to the housing and comprising a headed clamping member passing through an opening in the end wall of the housing and removably engaging the thrust block, the opening being larger than the clamping member, and a washer closing the space between the clamping member and the surrounding wall of the opening and supporting said clamping member; substantially as described.

16. In a device of the character described, a housing, a shaft, a thrust block for the shaft, and means for securing the thrust block to the housing and comprising a headed clamping member for passing through an opening in the end wall of the housing and removably engaging the thrust block, the opening being substantially larger than the clamping member, a washer in said opening and supporting said clamping member, and said washer having a flange engaging the outer face of the end wall; substantially as described.

17. In a device of the character described, a housing, a shaft, a thrust block for the shaft, and means for securing the thrust block to the housing and comprising a headed clamping member passing through an opening in the end wall of the housing and removably engaging the thrust block, a washer removably supported in the opening of the end wall and supporting the clamping member, said washer having a flange engaging the outer face of the end wall, and cooperating faces on the end wall and flange to prevent rotation of the washer; substantially as described.

18. In a device of the character described, a housing, a shaft extending into the housing, a thrust block for the shaft, the housing having an opening for passage of the thrust block, means in the housing for locating the thrust block with respect to the shaft, and means for clamping the thrust block to the housing, said means extending through the housing and removably engaging the thrust block; substantially as described.

19. In a device of the character described, a housing, a shaft, a thrust block for the shaft, the housing having an end wall and an opening located in lateral opposition to the space inside of the end wall for passage of the thrust block therethrough, and means for removably securing the thrust block to the end wall; substantially as described.

In testimony whereof we hereunto affix our signatures.
RICHARD J. BRITTAIN, JR.
OTTO W. YOUNG.